(12) United States Patent
Pereira

(10) Patent No.: US 6,584,474 B1
(45) Date of Patent: Jun. 24, 2003

(54) METHOD AND APPARATUS FOR FAST AND COMPREHENSIVE DBMS ANALYSIS

(75) Inventor: Hilton M. Pereira, Thousand Oaks, CA (US)

(73) Assignee: Computer Associates Think, Inc., Islandia, NY (US)

(*) Notice: Subject to any disclaimer, the term of this patent is extended or adjusted under 35 U.S.C. 154(b) by 0 days.

(21) Appl. No.: 09/496,975

(22) Filed: Feb. 2, 2000

Related U.S. Application Data

(62) Division of application No. 09/144,011, filed on Aug. 31, 1998, now Pat. No. 6,108,653.

(51) Int. Cl.⁷ .............................................. G06F 17/30
(52) U.S. Cl. ...................................... 707/200; 707/104
(58) Field of Search ..................... 707/200, 3, 103, 707/104; 709/224

(56) References Cited

U.S. PATENT DOCUMENTS

| | | | |
|---|---|---|---|
| 4,506,326 A | 3/1985 | Shaw et al. | 364/300 |
| 5,261,093 A | 11/1993 | Asmuth | 707/2 |
| 5,806,060 A | 9/1998 | Borgida et al. | 707/3 |
| 5,864,856 A | 1/1999 | Young | 707/100 |
| 5,873,091 A | 2/1999 | Garth et al. | 707/100 |
| 5,974,407 A | 10/1999 | Sacks | 707/2 |
| 6,081,809 A * | 6/2000 | Kumagai | 707/104 |
| 6,094,650 A * | 7/2000 | Stoffel et al. | 707/3 |
| 6,112,238 A * | 8/2000 | Boyd et al. | 709/224 |
| 6,122,640 A * | 9/2000 | Pereira | 707/103 |
| 6,185,555 B1 * | 2/2001 | Sprenger et al. | 707/3 |

OTHER PUBLICATIONS

Oracle 7tm Server *SQL Language Reference Manual*, Part No. 778–70–1292, Dec. 1992, pp. 4–89 thru 4–96.
Oracle 7tm Server *Concepts Manual*, Part No. 6693–70–1292, Dec. 1992, pp. 15–1 thru 15–14.

* cited by examiner

*Primary Examiner*—Sanjiv Shah
(74) *Attorney, Agent, or Firm*—Calfee, Halter & Griswold LLP

(57) ABSTRACT

A fast and comprehensive analysis of a database table is peformed by reading a header block describing the location of blocks storing data information of a database table. The data blocks of the database table are read using direct asynchronous IO into memory. Data read in from the data blocks is analyzed to determine information regarding the health or condition of the database table. The analysis is performed by spawning separate processes, each process being assigned an approximately equivalent number of data blocks to analyze. Once each process completes analysis of the assigned data blocks, the analysis by each thread is summarized and averaged to provide information to the DBA relating to the condition of the database table. The information gathered regarding the database table is more comprehensive than that provided by currently available database management systems and tools.

19 Claims, 4 Drawing Sheets

METHOD AND APPARATUS FOR FAST AND COMPREHENSIVE DBMS ANALYSIS

This application is a division of, U.S. application Ser. No. 09/144,011, filed Aug. 31, 1998, now U.S. Pat. No. 6,108,653.

BACKGROUND OF THE INVENTION

1. Field of the Invention

This invention relates to a method of analysis and of increasing the speed at which the condition of a database is determined. The invention is more particularly related to the determination of appropriate data needed for a comprehensive analysis of specific tables in the database, and to increase the speed at which the analysis for determining the condition of a database table is performed.

2. Discussion of the Background

With the increasing use of computer databases in each of the home, office, and scientific environments, computer users and Database Administrators (DBA's) are increasingly confronted with the tasks of determining the condition or health of databases and performing various operations to maintain the database, including reorganization or rebuilding of tables stored in the database. Before rebuilding a database table(s), the DBA must first determine whether the condition of the database table(s) requires rebuilding.

Typically, commercial database products include tools to perform analysis to determine the condition of a database. For example, Oracle database management systems include an analyze function that performs a predetermined function including an SQL call UPDATE_STATISTICS_FOR_TABLE. The analyze function reads a selected database table and generates a set of statistics that reveal the condition of the table.

FIG. 1 is a flowchart illustrating the basic steps performed by a conventional Database Management System (DBMS) for determining the condition of a database table. At step 10, a Database Administrator (DBA) provides the name of a table to be analyzed. The table name is provided to a DBMS function that returns data about the named table (step 20). The returned data is analyzed resulting in statistical information (step 30) which is then placed (stored) in a location for retrieval for by DBA (step 40).

The DBMS function that returns data (DBMS analysis function) is shown in FIG. 2 and includes the steps of building an SQL call (step 50), invoking the SQL call (step 60), performing SQL overhead and administrative functions (step 70), and returning the SQL results (step 80). The SQL results are provided as the return values (statistical information) in step 30 of FIG. 1.

Once the SQL results are analyzed, the displayed (or stored) information is utilized by the DBA to determine appropriate action, if needed, to properly maintain the database (rebuild tables, for example). In the example function, UPDATE_STATISTICS_FOR_TABLE, the Oracle DBMS provides table information including No. of Rows, Chained Rows, Blocks allocated, Blocks allocated but free, Blocks on freelist, Average available space in Freelist, Average free space in a Block, and Min, Max, Average Row Length.

However, the provided table information does not provide enough information to give the DBA the most accurate picture of the DBMS table condition. In addition, current methods for retrieving the DBMS table information are slow, being encumbered by overhead associated with standard DBMS procedures and function calls (file reading techniques, and SQL, for example).

Modern database tables contain enormous amounts of data. If a DBA needs to determine the condition of a large database table, analysis techniques based on current methods can take unacceptably large amounts of time during which a database table may not be available to a user. Furthermore, current methods do not provide the DBA with the exact information needed for a proper analysis. Therefore, the DBA may rebuild tables when it is not necessary or where other action may have been more appropriate. All of the above leads to increased down time and maintenance efforts.

SUMMARY OF THE INVENTION

The present inventor has realized the need for increasing the amount of data gathered to determine the condition of tables within a database and to increase the speed at which the condition is determined. Accordingly, it is an object of the present invention to provide a comprehensive analysis of at least one database table to determine an information set relating to the health of the tables analyzed.

It is another object of this invention to provide method to increase the speed at which database tables are analyzed.

These and other objects are accomplished by a method for analyzing database tables including the steps of identifying a database table, determining elements corresponding to the condition of the database table based on data contained in the database tables and providing said elements to one of a display for viewing by a user, a storage location, and a mechanism for using said elements. The elements determined include at least one of number of simple rows, number of migrated rows, number of deleted rows, number of blocks initialized but empty, average free space in a block unused, average free released free space, average row length of migrated rows, average row length of chained rows, number of blocks to be read for normal, chained, and migrated rows, measure of density of blocks used, number of blocks exceeding a percentage used threshold, number of blocks less a percentage free threshold, number of chained rows spanning data files, and min max average of chained rows spanning blocks.

In addition, a method to increase the speed of analysis is provided including the steps of identifying a table in said database, reading each of blocks associated with said table using direct asynchronous I/O, and performing said analysis based on information contained in said blocks.

Additional speed of analysis is provided by parallel processing and bypassing SQL overhead associated with regular RDBMS architectures. The parallel processing includes the steps of dividing the blocks read into plural sets, and providing each set to separate processes to determine information needed for the analysis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
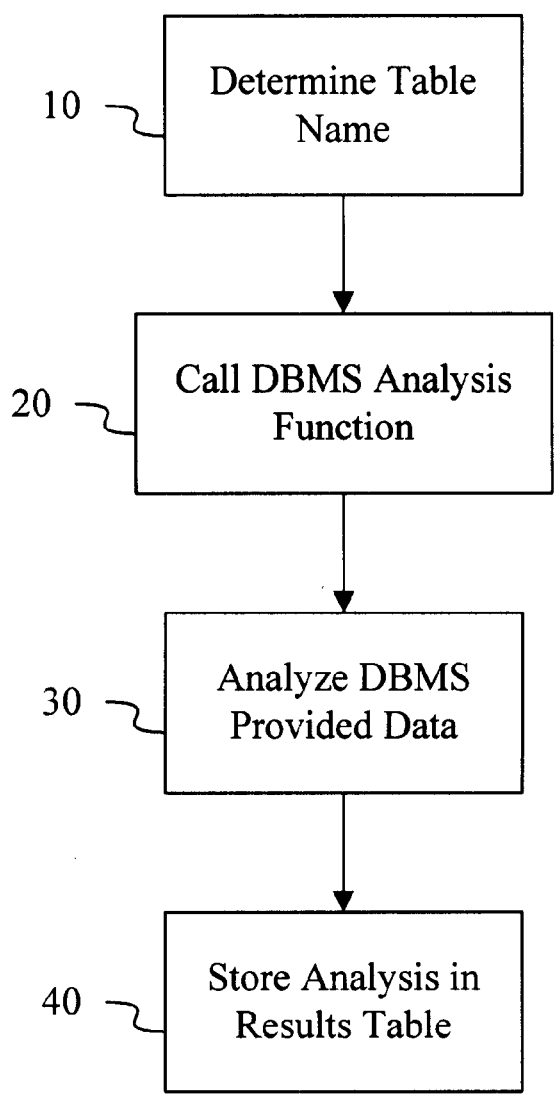
FIG. 1 is a flow chart of a conventional routine for determining status of a database table.
Figure 2:
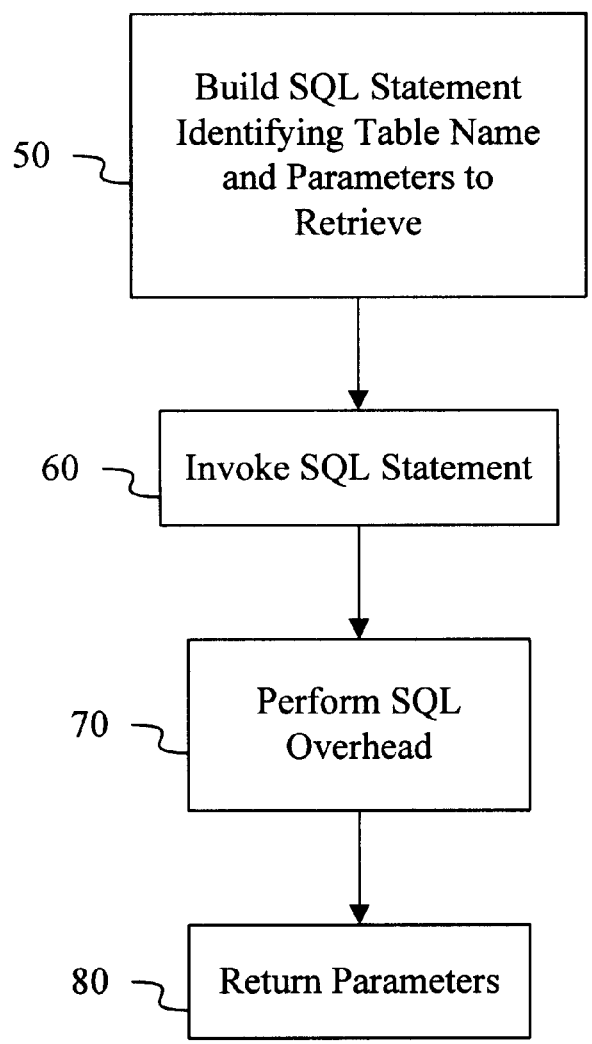
FIG. 2 is a flow chart of a conventional database management system (DBMS) analysis function for retrieving information needed to determine the status of a database table.

Conventional Database Management Systems (DBMS) utilize tables to store related data in a database. Once a table is defined, the DBMS will allocate blocks for storage of the related data. For example, if a table is to be built to contain 100,000 rows, and the rows of the table were defined such that 100 rows could fit per block, the DBMS would allocate 1,000 blocks to build the table.

Generally, DBMS systems allocate blocks in sets of contiguous blocks. A contiguous set of allocated blocks is commonly referred to as an extent. As a general rule, extents vary in size. Using the above example, the DBMS may utilize a single extent of 1,000 blocks, 2 extents of 500 blocks, or any other combination of extent sites to allocate the required 1, 000 blocks to build the table. Once the required blocks are allocated, the data is then stored in rows in the table utilizing the blocks allocated.

Over the course of time, additional data may be added to the table and the DBMS will allocate additional blocks as required. For example, if a user adds 250 rows to the table, using the above parameters, an additional 3 blocks would need to be allocated. Also over the course of time, information in the database may be deleted. In this case, deletion of rows occurs through the use of SQL to delete rows from the table. For example, a user may delete fifty rows from block 1, 40 rows from block 20, and 30 rows from block 60. When this occurs, it causes there to be more blocks in the table than required to maintain the data present in the table.

From time to time, the Database Administrator (DBA) will perform an analysis on each table that provides information regarding the condition of the database table. For example, the database administrator may look at information regarding the number of deleted rows to ascertain efficiency information with respect to how many blocks are holding deleted rows.

As another example, the Database Administrator may look to see whether a table has become fragmented. Row migration is one type of fragmentation. Row migration occurs when a row gets updated and the original space allocated for the row in the block is insufficient to hold all of the updated information. In this case, the row is moved to a location with more space, and a pointer is placed in the block where the original row resided, the pointer now pointing to the location of the moved (migrated) row. A large amount of row migration would tell the DBA that perhaps an inadequate amount of space was allocated for the original rows.

More often than not, there is insufficient space in a block to hold an updated row. In this case, the row is migrated to an entirely different block than where the original row resided, and the pointer is placed in the original row position points to the updated row in the different block.

Row migration causes increased retrieval time of database information because a pointer must be read and interpreted, and possibly two or more blocks (the block containing the pointer, and the block containing the actual row data) must be read to retrieve row specific information, as compared to a single block read for tables having no row migration.

It is useful for the database administrator to be able to retrieve information on row migration within a database table. If a lot of row migration has occurred, the database administrator may likely decide to rebuild the tables to more efficiently allocate row space.

In another example, a DBA makes a decision regarding the management of a row allocation within blocks of a table by setting a percentage of blocks free (PCTFREE) or percentage of blocks used (PCTUSED). For example, the DBMS allows the DBA to set PCTFREE when a database table is created. Then, as the DBMS fills up each block with table information, it will keep a percentage of the block free at least equal to the percentage PCTFREE for row updates.

The DBA sets the PCTFREE variable depending on how the database table is to be used. For example, if a table is to have frequent updates, additional PCTFREE would be established so that enough space is available to allow any necessary row migration to occur within the same block. As discussed above, row migration within the same block causes a table to become fragmented. However, rows migrated within the same block are retrieved with a single block read rather than the cumbersome process of reading a block, interpreting a pointer, and reading a second block (or more) as occurs when rows are migrated to different blocks. Therefore, appropriate PCTFREE settings allow DBMS performance to be maintained although the database tables may be modified.

PCTUSED is another parameter that allows the DBA to control the row allocation of a DBMS table. The DBMS prevents additional rows to be placed in a block unless the percentage of that block has fallen below PCTUSED. PCTUSED is different from PCTFREE in the sense that although a block may be used if there is an update, it will not be used to insert a new row unless the percentage used in the block is below PCTUSED. Therefore, PCTFREE is used to maintain free space when the table is initially built, and PCTUSED determines whether a new row may be inserted in a block. The PCTUSED parameter comes into effect when used space becomes free due to deletes.

In analyzing the database table, a DBA will look to see how closely the use of blocks of a table correspond to PCTUSED and PCTFREE set for that table.

If the average free space for a table is high, the DBA may decide to rebuild the table with a lower PCTFREE because space is being wasted. Conversely, if the hereinbelow described parameter BOCKS_LESS_THAN_PCTUSED is sufficiently high, it tells the DBA that too much migration is taking place and that it may be preferable to rebuild the tables with optimal values for PCTFREE and/or PCTUSED.

Thus, the value of knowledge regarding the condition of database tables is firmly established. However, conventional database management systems do not provide enough information for a DBA to make the most intelligent and efficient decisions regarding how and when tables within a database should be altered, modified, or rebuilt.

The present invention, hereinafter referred to as Fast Analysis, provides a detailed view of the condition, or health, of the database table allowing the DBA to make well informed decisions as to how to maintain the DBMS tables.

Referring to Table 1, a chart is provided comparing information gathered by Fast Analysis in comparison to a conventional DBMS system (Oracle, in this example). As shown in Table 1, Fast Analysis provides information regarding the condition of database tables in greater depth and quantity as compared to the conventional system.

TABLE 1

Comparison of Fast Analysis and Oracle Information Gathered

| Name | Fast Analysis | Oracle | Description |
|---|---|---|---|
| ROW COUNT | X | X | No. of Rows |
| NORMAL ROW COUNT | X | | No. of Simple Rows |
| MIGRATE ROW COUNT | X | | No. of Migrated Rows |
| CHAINED ROWS | X | X | No. of Chained Rows |
| DELETED ROWS | X | | No. of Deleted Rows |
| BLOCK COUNT | X | X | No. of Blocks allocated for table |
| USED BLOCK COUNT | X | X | No. of Blocks used by a table |
| EMPTY BLOCK COUNT | X | | No. of Blocks initialized but empty |
| FREE BLOCK COUNT | X | X | No. of Blocks allocated but free |
| BLOCKS ON FREELIST | X | X | No. of Blocks on the freelist |
| AVG SPACE IN FREELIST BLKS | X | X | Average available space in freelist blocks |
| AVG FREE SPACE | X | X | Average free space [across blocks in a table] in a block |
| AVG UNUSED FREE SPACE | X | | Average free space in a block never used |
| AVG RELEASED FREE SPC | X | | Average free released free space in box |
| ROW LENGTH | X | X | Min, Max, Average Row length |
| AVG MIGRATED ROW LEN | X | | Average row length of chained rows |
| BLOCK READS | X | | No. of Blocks to be read for normal, chained and migrated rows. |
| BLOCK FILL PERCENTAGE | X | | Measure of Density of the blocks used |
| BLKS MORE THAN PCTFREE | X | | No. of Blks exceeded PCTFREE |
| BLOCKS LESS THAN PCTUSED | X | | No. of Blks less than PCTUSED |
| FILESPAN COUNT | X | | No. of chained rows spanning datafiles |
| BLOCKSPAN OFFSET | X | | min, max average of chained rows spanning blocks |
| AVG BLOCK HEADER | X | | Avg. Block header size |
| AVG BLOCK DATA | X | | Avg. space available in a block |
| MIGRATED AND CHAINED CNT | X | | No. of rows migrated and chained |
| MIGRATED OR CHAINED CNT | X | | No. of rows either migrated or chained |
| AVG ROW DIR ENTRIES | X | | Reusable offsets to row data |
| TOTAL ROW DIR ENTRIES | X | | No. of row directory entries |
| AVG NORMAL ROW LEN | X | | Avg. length of a normal row |
| AVG CHAINED ROW LEN | X | | Avg. length of migrated and chained rows |
| AVG MIGRATED AND CHAINED ROW LEN | X | | Avg. length of migrated and chained rows |
| HOME ROW READS | X | | No of initial blocks to read all rows of a table |
| MIGRATED ROW READS | X | | No of additional blocks to read for migrated rows |
| CHAINED ROW READS | X | | No of additional blocks to read for chained rows |

In order to determine the information in Table 1, the structure of the database tables is first established. For example, in an Oracle database, table structure is based on an Oracle block which is defined as a unit of data storage (e.g., an Oracle block storing rows of data for a table is an Oracle data block). Block size in bytes is defined by an instance parameter by the DBA at the time of configuration and different types of Oracle blocks store different types of information.

As the tables are built, groups of blocks, known as extents, are allocated. Every Oracle table has an initial allocation of blocks which constitutes the first extent for an Oracle table. Subsequent extents (contiguous sets of blocks) are allocated to accommodate growth of the table and are allocated based on a next extent parameter specified at table creation.

Every table has an extent segment header which maintains an extent list in the form of file number (identifying a file), block number (identifying an offset within the file), and length for each extent of the table. In Oracle, the extent segment header is the starting block for a given table. The extent list and a free list is stored in this block. The address of this block (extent segment header) is available as part of information stored in a table which is part of a system dictionary (Oracle system dictionary, for example).

In Oracle, a unique block address is a combination of a file number and a block number. The file number is a unique number that is assigned to each data file managed by the DBMS. A block number is relative to a file and relates to an offset in the file. Therefore, a file offset can be calculated given the block number and the block size for the instance.

Although the above structural elements (blocks, extents, extent segment header, etc.) are described in terms of an Oracle database and tables, the same structure applies to other databases and tables as well (Sybase and Informix, for example). In addition, other database structures can also be appropriately described utilizing the same or related terminology.

For example, although a block is a typical unit data storage, other database implementations may be based on pages. In this case, an extent would be a group of pages rather than blocks, and the extent itself may be described using other terminology. Therefore, an extent can be generically described, as a group of contiguous pages, blocks, or any unit of data storage. In addition, the extent segment header or extent segment header block can be generically defined as any file or other storage where header information about a table can be found, i.e., any location or locations where various extents and their respective sizes used in building one or more database tables may be considered an extent segment header.

Consistent with the above discussion, it is important to note that although Fast Analyzer as described herein provides information described in terms of specific parameters consistent with the structure of an Oracle database (blocks, for example), these terms are applicable in a generic sense to all database applications and therefore Fast Analyzer should not be limited to any specific database implementation.

The following is an element by element explanation of the table information gathered by Fast Analyzer. Each piece of information (element) is defined along with a clarifying explanation including implications where applicable. Information gathered by Fast Analyzer are typically stored in a repository, such as the DAO repository, for example, as defined hereinbelow. The information gathered by Fast Analyzer is divided into the following categories: block level information, block space usage information, row level information, row level space information, and information to measure block and file I/O.

BLOCK LEVEL INFORMATION

1. Used_Block_Cnt

Total number of Blocks that have one or more rows for a given Oracle table. This may be less than the number of blocks allocated for the table.

2. Empty_Block_Cnt

Total number of Blocks that are included in the extent and block high water mark, but have no rows in them. The blocks are initialized for use and are potentially the next candidates to be filled when new rows are inserted for the given table. The extent and block high water indicators are stored in the segment header block of an Oracle table to indicate the current allocation usage of an Oracle table. Sum of USED_BLOCK_CNT and EMPTY_BLOCK_CNT is the value for BLOCKS in the DBA_TABLES view.

3. Free_Block_Cnt

Total number of Blocks which are part of the allocation for the table but have never been initialized. Same as the Oracle's EMPTY_BLOCKS in the DBA_TABLES view.

4. Emb_Cnt

Total number of blocks used by the segment header to hold an unlimited extent list. When a table is created with the unlimited extents option, it is possible that the list of extents which are stored in the segment header exceed the space available in a block, the extent segment header entries points to additional blocks which contain extent list and or freelist information.

5. Freelist_Block_Cnt

Total number of blocks on the freelist. Oracle maintains a list of blocks available for new row inserts. If an Oracle block is filled less than PCT_FREE this block is on the freelist. If rows in an Oracle block get deleted after reaching the PCT_FREE limit and the block usage falls below the PCT_USED limit the block is put on the freelist.

BLOCK SPACE USAGE INFORMATION

1. Avg_Released_Free_Space

Released free space in a block is defined as the space previously used and now available due to row deletions or migrations. Released free space need not be contiguous in the block. Average released free space is the average of the released free space in bytes for the blocks of the table.

2. Avg_Unused_Free_Space

Unused free space is defined as the free space in the block not yet used by the block for any rows. Unused free space is contiguous, given the fact Oracle stores rows bottom up, it is the space between the row directory and the last row inserted. Average unused free space is the average of the unused free space in bytes of the blocks for the given table.

3. Avg_Free_Space

Free space is the sum of the unused free space and the released free space for a block. Average free space in bytes, is the average of the free space available in the blocks for the given table. This statistic is the same as the AVGSPC statistic in Oracle 7.x and AVG_SPACE statistic in Oracle 8.x found in the DBA_TABLES view.

4. Avg_Space_Freelist_Blocks

Average Free space in bytes found in Oracle blocks that are on the freelist. This statistic is the same as the AVG_SPACE_FREELIST_BLOCKS in Oracle 8.x found in the DBA_TABLES view. This information is not reported by Oracle in versions prior to 8.x.

5. Used_Block_Fill_Percentage

This statistic is a measure of the block fill for blocks that have one or more rows in them. The percentage is measure of the amount of space used for data in a block versus the amount of space available for data in a block, not the block size.

6. Blocks_Fill_More_Pctfree

The number of blocks which are found to be filled more than the PCT_FREE limit assigned to the table. This occurs when rows in the block are updated and get migrated within the block.

7. Block_Fill_Less_Pctused

The number of blocks which are found to be empty less than the PCT_USED limit assigned to the table. This occurs when rows in the block are either deleted or migrated and the space occupied by rows falls below the PCT_USED limit.

8. Avg_Block_Header_Bytes

Each data block contains a block header which contains the table directory, row directory and transaction information storage areas. The AVG_BLOCK_HEADER_BYTES is the average space used in bytes to store block header information for the Oracle blocks of a given table.

9. Avg_Block_Data_Bytes

The space available for row data storage in a block. The Average space available in bytes for row data storage in the Oracle blocks of a given table.

ROW LEVEL INFORMATION

1. Row_Cnt

The total number of rows found in the blocks for the given table. This statistic is the same as the NUM_ROWS statistic in Oracle, found in the DBA_TABLES view.

2. Normal_Row_Cnt

The total number of rows that are neither migrated nor chained and are found as one contiguous piece in an Oracle block.

3. Migrate_Row_Cnt

The total number of rows that have been found to be migrated for a given table. Migration of a row normally occurs when a row is being updated cannot be updated in place, hence Oracle stores a forwarding pointer and relocates the entire row in the same or new block.

4. Chain_Row_Cnt

The total number of rows that are chained for a given table. A row is defined to be chained when the entire row does not fit into an Oracle block and hence is stored as row pieces in separate blocks, each row piece has forward and backward pointers linking the row pieces together.

5. Migrate_And_Chain_Row_Cnt

The total number of rows that are migrated and chained as per the previous definitions

6. Chained_Or_Migrated

The sum of all rows that are either chained or migrated or both. Oracle reports this statistic as CHAIN_CNT in the DBA_TABLES view.

7. Delete_Row_Cnt

The total number of rows that are marked as being deleted in the blocks for a given table. A row when deleted is just marked as being deleted in the row directory of an Oracle block and the space occupied is not reclaimed. The DELETE_ROW_CNT is a count of such entries.

8. Avg_Row_Dir_Entries

Row directory entries are entries in an Oracle block that contain offsets that point to row data. These entries are created as new rows are inserted but never deleted. These entries may be reused.

9. Total_Row_Dir_Entries

The Total number of row directory entries found in all the Oracle blocks for a given table. This number may be more than the number of rows if deletions and updates occur on the given table.

ROW LEVEL SPACE INFORMATION

1. Avg_Row_Len, Min_Row_Len, Max_Row_Len

The average, minimum and maximum row length in bytes found in the Oracle Blocks for a given table. The AVG_ROW_LEN statistic is the same as AVG_ROW_LEN Oracle reported statistic in the DBA_TABLES view for a given table.

2. Avg_Normal_Row_Bytes

The average length in bytes for a normal rows of a table, see normal row definition.

3. Avg_Migrated_Row_Bytes

The average length in bytes for a migrated rows of a table, see migrated row definition.

4. Avg_Chained_Row_Bytes

The average length in bytes for a chained rows of a table, see chained row definition.

5. Avg_Mig_And_Chained_Row_Bytes

The average length in bytes for migrated and chained rows of a table, see migrated and chained row definition.

INFORMATION TO MEASURE BLOCK AND FILE I/O

1. Min, Avg, Max Chain_Blockspan_Offset

Chained rows span blocks, in an Oracle data file block numbers are relative to the start of the data file. The blockspan offset is a measure of, the distance between blocks containing chained row pieces. The minimum, average and maximum is collected for a given Oracle table that has chained rows.

2. Chained_Rows_That_Span_Files

The total number of chained rows that have row pieces in more than one Oracle datafile.

3. Home_Row_Reads

The total number of initial blocks to be read if all the rows of the table were requested for. If the table did not have any migrated or chained rows then the total number of blocks to read to access all rows would be equal to the HOME_ROW_READS.

4. Migrated_Row_Reads

The total number of additional blocks to be read if all migrated rows of the table were requested for. A row can be migrated more than once and it is possible to have more than two block i/o's for one row.

5. Chained_Row_Reads

The total number of additional blocks to be read if all chained rows of the table were requested for. A row can be chained over more than one block and it is possible to have more than a two block i/o for one row.

The above described information provides the DBA with a comprehensive set of data for determining the condition of a database table. Each element is determined by reading the blocks of a database table, examining the contents of the blocks, and deriving the information needed to determine the element.

Figure 3:
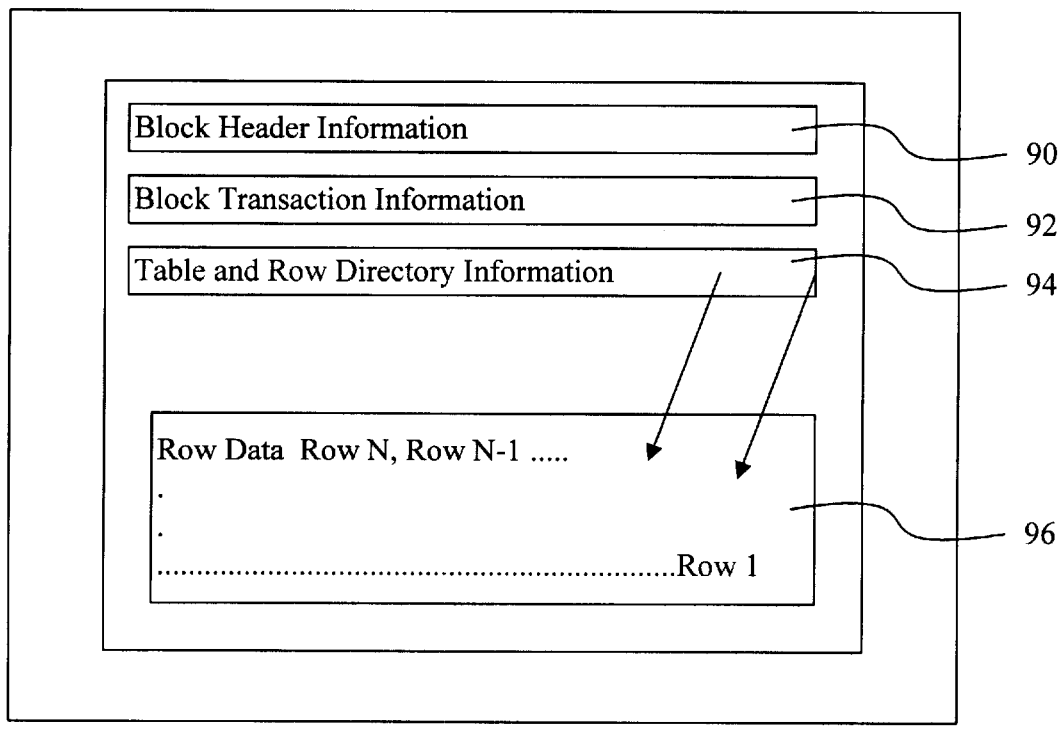
FIG. 3 is an illustration of processing of a data block.

Proper examination of the contents of a block requires knowledge regarding the structure of the block. Block structure may be obtained either from a specification describing the structure or by investigation of a block already created. For example, FIG. 3 illustrates the structure of an Oracle data block. Each data block of an Oracle table is made up of a block header 90, block transaction information area 92, and a table and row directory 94 containing pointers to row data 96. The row data itself is filled bottom up.

The above described elements are divided into block level information, block space usage information, row level information, row level space information, and information to measure block and file I/O, each present in some form or another in the block itself. For example, block space usage information is present in the block header 90. The number of rows, number of row directory entries, and deleted rows for the block can be found in the table and row directory area 94. The table and row directory provides pointers to find actual row data.

Row types to determine migrated, chained, and normal rows can be decoded from a row type that is stored within each row. Each row is looked at to compute row size which provide the row level space information. Within each row is provided pointers if the row is incomplete (i.e. is migrated or chained). Following these rows is necessary to determine actual row size information and related elements. Block level information is typically gathered from the extent segment header for the table and information provided in the block header itself.

Most of the information are computed in various ways to enable future modeling. Therefore, FASTANAL must collect the following for most metrics:

Minimum

Maximum

Average

Standard Deviation (Optional)

Minimum and Maximum are determined for each piece of information (metric). The easiest way to compute the Average is to keep a running total of the sum of the metric, as well as a count of the number of data-points collected. Then, use the formula below for the standard mean (Average):

A=X/n where:

X=data value n=number of points in each series

Standard Deviation is then computed with a second pass by comparing the deviation of each data value with the Average computed above. Since Standard Deviation requires a second pass, it must be specifically requested.

$$\sigma = v((X-A)^2)n$$

The present inventor has also realized that, in addition to extending the analysis performed on database tables, there is a need to improve the speed of the analysis. Fast Analysis provides an extended information set (metrics), and improves the speed at which the metrics are retrieved and processed.

Conventional database management systems utilize SQL or related commands to provide information for a limited analysis of tables in the database. However, this process is slow because of the overhead costs incurred by the database management system (particularly relational database management systems). For example, the Oracle Analyze command utilizes the SQL call UPDATE_STATISICS_FOR TABLE, which invokes all the overhead associated with the Oracle DBMS.

Therefore, conventional DBMS analysis are restricted to a few items of information and are relatively slow.

The Fast Analysis process is significantly faster than the Oracle analyze command. The speed enhancements are achieved by using direct asynchronous I/O, performing block read aheads when reading the database data files and by parallelizing the processing and analysis of data contained in the files.

By using direct asynchronous I/O to read database files, Fast Analysis is able to directly access specific blocks of a file, thereby bypassing the overhead of typical DBMS routines (SQL shared memory techniques, and other parameters required to access the database tables, for example).

The additional overhead required of typical DBMS calls occurs because SQL and other shared retrieved techniques form a generalized language implemented to provide flexibility in retrieval of database information. In contrast, the Fast Analysis is more singular in purpose and directly retrieves the information needed.

Fast Analysis operates on the following assumptions:

1. The Fast Analysis process has DBA privileges or read permissions to necessary system files (system dictionary, for example).

2. The Fast Analysis process has read permissions to the data files of the DBMS and particularly any specific tables to be analyzed.

Figure 4:
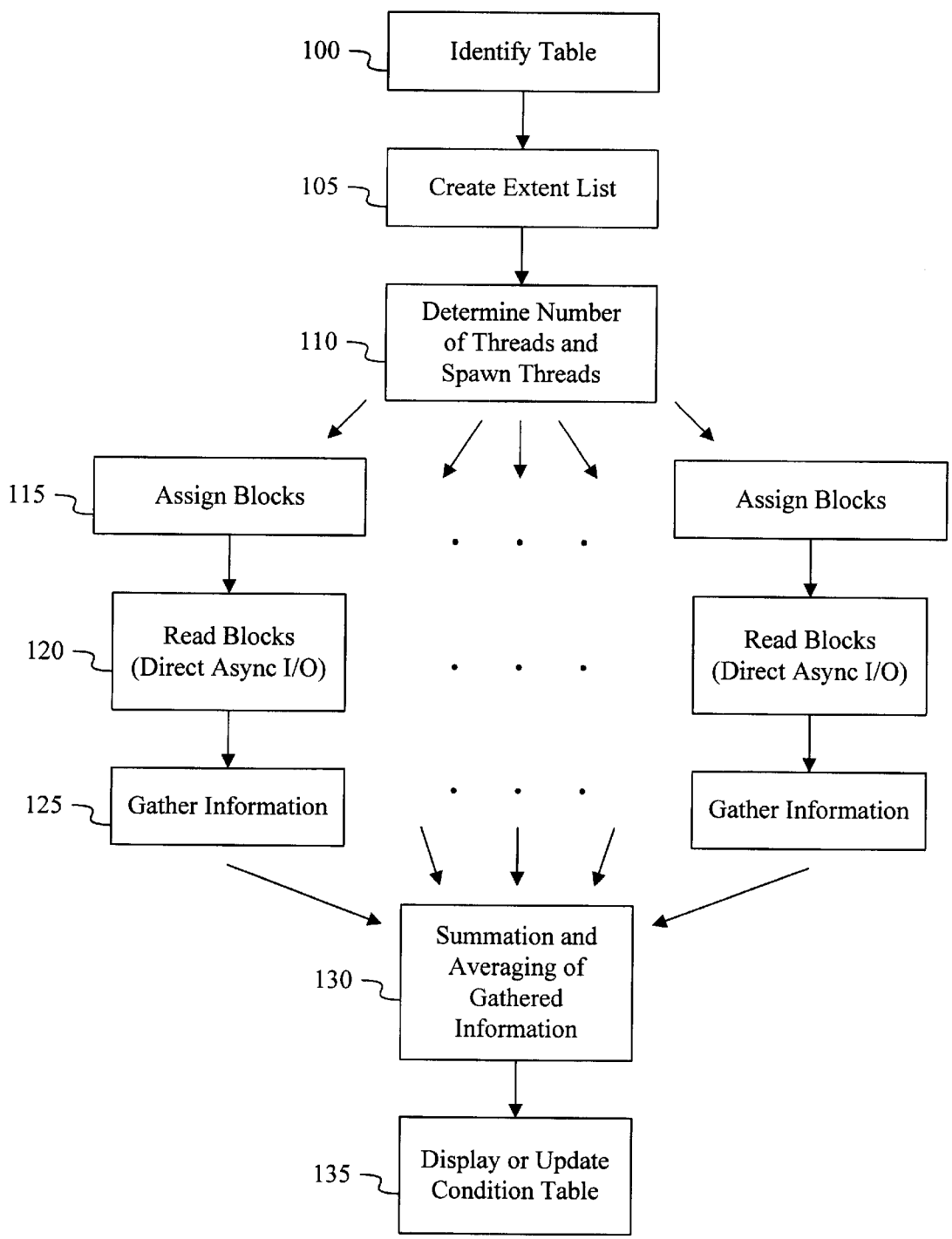
FIG. 4 is a flowchart of the Fast Analysis method for accessing a database table and analyzing table contents according to the present invention.

Considering the DBMS Block Structure as discussed above (blocks or pages, extents, and extent header or equivalent structure), the Fast Analysis process is described. Referring to FIG. 4, a user (database operator, DBA, or other mechanism inquiring as to the condition of a database table) first identifies the table of which the condition is to be determined. The table is normally identified by providing the table name (Step 100), and includes determining the location of the extent header segment block for the given table (System Dictionary, for example). The location of the extent segment header block can normally be found in another table that specifies the location of the header block.

At step 105, the extent segment header block is read and an extent list is created. The extent list includes identifying information for each set of blocks allocated for the table. For example, in one embodiment of the present invention, the extent list includes a file number, block number, and length for each extent in the list. Other types of identifying information such as pages, location or size of the data to be processed, depending on the structure of the data base files, is also appropriate for construction of the extent list. In a more basic description, the extent list need only identify the location(s) of all space allocated for the identified table.

At step 110, the Fast Analysis process determines a number of threads to spawn. The number of threads to spawn can be based upon the number of blocks, or size of the table to be analyzed. This includes reading the extent list to determine how many blocks need to be processed. Physical limitations on the number of useful threads (for example, the number of separate processors available for spawned processes) may be considered. In addition, a specific physical condition or an optimal number of blocks that may be processed in a single thread (100 megabytes of data or 10 blocks, for example) may limit or guide determination of the number of threads to spawn.

Included in step 110 is the creation of one or more sub-lists from the list created at step 105. Each sub-list is preferably created using either an equal number of blocks or proportionately as close to equal as possible to maximize efficiency of the separate parallel processes (threads) to which the lists will be assigned.

If necessary, an item may also be split from the original list, and unequal lists of blocks may be utilized. For example, if 1001 blocks are to be processed, sublists containing 500/501, 300/300/401, and 50/800/151 may be spawned, the latter combinations only having less efficiency assuming equal processing power in each thread.

Each sublist contains the following information for each item in the list: File number, starting block, and number of blocks to process from the starting block number. Again, similar pertinent information may be described in terms of page count, bytes, or other units of data storage and not depart from the scope of the present invention.

Once the threads are spawned, each thread is assigned a number of blocks to process (step 115). Preferably, the assigned blocks are contained in one of the sublists created in step 110. Alternately, the sublists may be created upon (or contemporaneously with) assignment. Other variations regarding the order or responsibility of each step may be made, again, without departing from the scope or intent of the present invention.

At step 120, the assigned blocks are read into memory or other storage location using direct asynchronous I/O. As discussed above, the use of direct asynchronous I/O provides direct and immediate access to the data stored in the database table.

At step 125, the blocks read are examined to determine the contents of each block. In this manner, block and row statistics are gathered from the blocks read. Once all threads have finished processing their respective assigned set of blocks, summation and averaging of information gathered from each thread is performed (Step 130).

At Step 135, the gathered information is either displayed or utilized to update a condition table or provided to another mechanism for using the information gathered. The process may be repeated for any number of tables that may be contained in the data base.

Thus, Fast Analysis provides comprehensive information regarding the condition of database tables and increases the speed at which database information is retrieved and processed. Table 2 illustrates a DDL definition of a DAO repository that may be utilized to store Fast Analysis information extracted from the database tables.

TABLE 2

DDL Definition of DAO Repository

```
/
CREATE TABLE DAO.COMMON_DICT
    OBJECT_ID           NUMBER
        CONSTRAINT      TABLE_DICT_ID
        PRIMARY KEY
        USING INDEX     TABLESPACE DA02,
    COLLECT ID          NUMBER
        CONSTRAINT      TABLE_DICT_COLLECT_ID
        REFERENCES      DAO.COLLECT,
    PCT FREE            NUMBER,
    PCT USED                        NUMBER,
    CACHE                           NUMBER(1),
    TABLE LOCK                      VARCHAR2(8),
    NESTED                          NUMBER(1),
    NUM ROWS                        NUMBER,
    BLOCKS                          NUMBER,
    EMPTY BLOCKS                    NUMBER,
    AVG SPACE                       NUMBER,
    CHAIN CNT                       NUMBER,
    AVG ROW LEN                     NUMBER,
    AVG SPACE FREELIST BLOCKS       NUMBER,
    NUM FREELIST BLOCKS             NUMBER,
    SAMPLE_SIZE                     NUMBER,
    IOT NAME                        VARCHAR2(30),
    IOT TYPE                        NUMBER(1),
    TABLE TYPE OWNER                VARCHAR2(30),
    TABLE TYPE                      VARCHAR2(30),
    PACKED                          NUMBER(1),
    MIN EXTENT SIZE                 NUMBER,
    MAX EXTENT SIZE                 NUMBER,
    AVG EXTENT SIZE                 NUMBER,
    STD EXTENT_SIZE                 NUMBER
/
CREATE TABLE DAO.TABLE FAST_ANAL
    TABLE_ID        NUMBER
        CONSTRAINT TABLE_FAST_ANAL_ID
        PRIMARY KEY
        USING INDEX TABLESPACE DAO2,
    TRUE CHAIN CNT                  NUMBER,
    TRUE MIGRATE CNT                NUMBER,
    FREE LIST_LENGTH                NUMBER,
    EMB CNT                         NUMBER,
    SEGMENT _ HEADER _ HIGH_WATER   NUMBER,
    BLOCK HEADER SIZE               NUMBER,
    BLOCK DATA BYTES                NUMBER,
    MIN_N7ORMAL_ROWS_BYTES          NUMBER,
    MAX _ NORMAL_ROWS_BYTES         NUMBER,
    AVG _ NORMAL_ROWS_BYTES         NUMBER,
    STI) NORMAL ROWS BYTES          NUMBER,
    MIN DELETE ROWS BYTES           NUMBER,
    MAX_DELETE ROWS BYTES           NUMBER,
    AVG DELETE ROWS BYTES           NUMBER,
    STD DELETE_ROWS_BYTES           NUMBER,
    MIN MIGRATED ROWS BYTES         NUMBER,
    MAX MIGRATED ROWS_BYTES         NUMBER,
    AVG MIGRATED ROWS BYTES         NUMBER,
    STD _ MIGRATED ROWS_BYTES       NUMBER,
    MIN CHAINED ROW PIECE BYTES     NUMBER,
    AVG CHAINED ROW PIECE BYTES     NUMBER,
    STD CHAINED ROW PIECE BYTES     NUMBER,
    MIN NEW ROW PIECE BYTES         NUMBER,
    MAX NEW ROW PIECE BYTES         NUMBER,
    AVG_NEW_ROW_PIECE_BYTES         NUMBER,
    REFERENCES      DAO.COLLECT
/
```

Table 2 is not intended to be a working copy, but merely an example repository structure. Fast Analysis may be conveniently implemented using a conventional general purpose or a specialized digital computer or microprocessor programmed according to the teachings of the present specification, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, and magneto-optical disks, ROMS, RAMs, EPROMS, EEPROMS, magnetic or optical cards, or any type of media suitable for storing electronic instructions.

Stored on any one of the computer readable medium (media), the present invention includes software for controlling both the hardware of a general purpose or specialized computer and for enabling the computer to interact with a human user or other mechanism utilizing the product of the present invention. Such software may include, but is not limited to, device drivers, operating systems, and user applications. Ultimately, such computer readable media further includes software for determining the condition of a database or for specific database tables, as described above.

Included in the programming (software) of the general purpose or specialized computer are software modules for implementing the teachings of the present invention, including, but not limited to, identification and retrieval of database table structures, reading database files and tables, performing analysis of data retrieved from database tables and other related information, and the display, storage, or communication of results as determined by the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A method of analysis of a database, comprising:

identifying a table in said database;

reading each of blocks associated with said table using direct asynchronous I/O; and performing said analysis based on information contained in said blocks;

wherein reading includes:

creating plural block lists, each list identifying a set of blocks associated with said table;

spawning plural threads; and performing the following for each respective thread,
    assigning one of said plural block lists to the respective thread,
    reading each block identified by the assigned block list using direct asynchronous I/O; and
    gathering information for said analysis utilizing data contained in each block read.

2. The method according to claim 1, further comprising assigning each thread to a separate processor.

3. A method of analysis of a database, comprising:

identifying a table in said database;

reading each of blocks associated with said table using direct asynchronous I/O; and performing said analysis based on information contained in said blocks;

wherein identifying comprises:

determining the location of an extent segment header block of a database table;

reading the extent segment header block; and creating an extent list identifying each extent contained in the extent segment header block by file number, block number, and length.

4. The method according to claim 3, wherein:

reading each of blocks associated with said table includes:
dividing the extent list into at least two sublists each containing a number of blocks,
spawning a thread for working each of said sublists, and
gathering information related to said elements by each thread; and performing includes summing and averaging the information gathered by each thread to perform said analysis.

5. The method according to claim 4, further comprising assigning each thread to a separate processor.

6. The method according to claim 4, wherein dividing comprises:

dividing the extent list into at least two sublists each containing an equal number of blocks.

7. A computer readable medium having computer instructions stored thereon that, when loaded into a computer, cause the computer to perform the steps of:

identifying a table in said database;

reading each of blocks associated with said table using direct asynchronous I/O; and performing an analysis of said database based on information contained in said blocks;

wherein said step of reading includes the steps of:

creating plural block lists, each list identifying a set of blocks associated with said table;

spawning plural threads; and performing the following steps for each respective thread, assigning one of said plural block lists to the respective thread, reading each block identified by the assigned block list using direct asynchronous IO; and gathering information for said analysis utilizing data contained in each block read.

8. The computer readable medium according to claim 7, wherein said computer instructions further cause the computer to perform the step of assigning each thread to a separate processor.

9. A computer readable medium having computer instructions stored thereon that, when loaded into a computer, cause the computer to perform the steps of:

identifying a table in said database;

reading each of blocks associated with said table using direct asynchronous I/O; and performing an analysis of said database based on information contained in said blocks;

wherein said step of identifying comprises the steps of:

determining the location of an extent segment header block of a database table;

reading the extent segment header block; and creating an extent list identifying each extent contained in the extent segment header block by file number block number, and length.

10. The computer readable medium according to claim 9, wherein:

said step of reading each of blocks associated with said table includes the steps of, dividing the extent list into at least two sublists each containing a number of blocks, spawning a thread for working each of said sublists, and gathering information related to said elements by each thread; and said step of performing includes the step of summing and averaging the information gathered by each thread to perform said analysis.

11. The computer readable medium according to claim 10 wherein said computer instructions further cause the computer to perform the step of assigning each thread to a separate processor.

12. The computer readable medium according to claim 10, wherein said step of dividing comprises:

dividing the extent list into at least two sublists each containing an equal number of blocks.

13. An apparatus for analysis of a database, comprising:

means for identifying a table in said database;

means for reading each of blocks associated with said table using direct asynchronous I/O; and means for performing said analysis based on information contained in said blocks;

wherein said means for reading includes:

means for creating plural block lists, each list identifying a set of blocks associated with said table;

means for spawning plural threads; and means for performing the following steps for each respective thread, assigning one of said plural block lists to the respective thread, reading each block identified by the assigned block list using direct asynchronous I/O; and gathering information for said analysis utilizing data contained in each block read.

14. An apparatus for analysis of a database, comprising:

means for identifying a table in said database;

means for reading each of blocks associated with said table using direct asynchronous I/O; and means for performing said analysis based on information contained in said blocks;

wherein said means for identifying comprises:

means for determining the location of an extent segment header block of a database table;

means for reading the extent segment header block; and means for creating an extent list identifying each extent contained in the extent segment header block by file number, block number, and length.

15. An apparatus for analysis of a database, comprising:

means for identifying a table in said database;

means for reading each of blocks associated with said table using direct asynchronous I/O; and means for performing said analysis based on information contained in said blocks;

wherein said means for reading each of blocks associated with said table includes, means for dividing the extent list into at least two sublists each containing a number of blocks, means for spawning a thread for working each of said sublists, and means for gathering information related to said elements by each thread; and said means for performing includes means for summing and averaging the information gathered by each thread to perform said analysis.

16. The apparatus according to claim 15, wherein said means for dividing comprises:

means for dividing the extent list into at least two sublists each containing an equal number of blocks.

17. An apparatus for analysis of a database, comprising:

an identifying device configured to identify a table in said database;

a reader configured to read each of blocks associated with said table using direct asynchronous I/O; and an analyzer configured to perform said analysis based on information contained in said blocks;

wherein said reader comprises:

a list device configured to create plural block lists, each list identifying a set of blocks associated with said table; and a process spawner configured to spawn threads for processing and assign one of said block lists to each thread spawned; and wherein the following steps are performed by each respective thread, reading each block identified by the assigned block lists using direct asynchronous I/O; and gathering information for said analysis utilizing data contained in each block read.

18. An apparatus for analysis of a database, comprising:

an identifying device configured to identify a table in said database;

a reader configured to read each of blocks associated with said table using direct asynchronous I/O; and an analyzer configured to perform said analysis based on inforination contained in said blocks;

wherein said identifying device comprises:

a locator configured to determine a location of an extent segment header block of the database table and read the extent segment header block; and a list device configured to create an extent list identifying each extent contained in the extent segment header block.

19. An apparatus for analysis of a database, comprising:

an identifying device configured to identify a table in said database;

a reader configured to read each of blocks associated with said table using direct asynchronous I/O; and an analyzer configured to perform said analysis based on information contained in said blocks;

wherein said reader comprises, a divider configured to divide the extent list into at least two sublists each containing a number of blocks, a process spawner configured to spawn a thread for working each of said sublists, and an information gatherer configured to gather information related to said elements by each thread; and said analyzer comprises a summing device configured to sum and average the information gathered by each thread to perform said analysis.

* * * * *